US008132016B1

(12) United States Patent  (10) Patent No.: US 8,132,016 B1
Stewart et al.  (45) Date of Patent: Mar. 6, 2012

(54) METHOD, SYSTEM, AND COMPUTER PROGRAM PRODUCT FOR THE AUTHENTICATION OF MULTIPLE USERS IN A COMMON SESSION

(75) Inventors: Christopher Scott Stewart, San Antonio, TX (US); Pamela Ann Thibodeaux, San Antonio, TX (US); Bonnie Rose Stewart, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1126 days.

(21) Appl. No.: 10/892,296

(22) Filed: Jul. 15, 2004

Related U.S. Application Data

(60) Provisional application No. 60/488,011, filed on Jul. 17, 2003.

(51) Int. Cl.
*G06F 21/00* (2006.01)
(52) U.S. Cl. ........ 713/182; 713/155; 713/150; 713/183; 705/4; 705/67; 705/72; 709/225; 709/229; 715/224; 726/3; 726/4; 726/5; 726/6; 726/7; 726/28; 726/29; 380/255; 235/379
(58) Field of Classification Search .................. 713/155, 713/182, 150, 183; 726/3, 5, 28–29, 4, 6, 726/7; 705/4, 67, 72; 715/224; 380/255
See application file for complete search history.

(56) References Cited

U.S. PATENT DOCUMENTS

| | | | | |
|---|---|---|---|---|
| 4,839,804 A * | 6/1989 | Roberts et al. | ............... | 705/36 R |
| 5,907,831 A * | 5/1999 | Lotvin et al. | ................ | 705/14.27 |
| 6,178,407 B1 * | 1/2001 | Lotvin et al. | ................ | 705/14.73 |
| 6,636,888 B1 * | 10/2003 | Bookspan et al. | ............ | 709/203 |
| 6,968,317 B1 * | 11/2005 | Wallace et al. | ............. | 705/36 R |
| 6,976,164 B1 * | 12/2005 | King et al. | ..................... | 713/156 |
| 6,999,938 B1 * | 2/2006 | Libman | ............................ | 705/10 |
| 7,124,088 B2 * | 10/2006 | Bauer et al. | ....................... | 705/4 |
| 7,222,107 B2 * | 5/2007 | Ludwig et al. | .................. | 705/67 |
| 7,334,225 B2 * | 2/2008 | Boonie et al. | ................. | 717/171 |
| 7,383,213 B1 * | 6/2008 | Walter | ............................. | 705/35 |
| 7,533,063 B2 * | 5/2009 | Kianian | ......................... | 705/64 |
| 7,877,269 B2 * | 1/2011 | Bauer et al. | ....................... | 705/2 |
| 2002/0049806 A1 * | 4/2002 | Gatz et al. | ..................... | 709/203 |
| 2002/0165777 A1 * | 11/2002 | Lotvin et al. | .................... | 705/14 |
| 2003/0158844 A1 * | 8/2003 | Kramer et al. | .................... | 707/6 |
| 2004/0068468 A1 * | 4/2004 | North | .............................. | 705/39 |
| 2004/0138928 A1 * | 7/2004 | Monk | ................................ | 705/4 |
| 2004/0209596 A1 * | 10/2004 | Wong et al. | .................. | 455/405 |
| 2006/0004642 A1 * | 1/2006 | Libman | ............................ | 705/26 |
| 2006/0026081 A1 * | 2/2006 | Keil et al. | ........................ | 705/27 |
| 2007/0203756 A1 * | 8/2007 | Sears et al. | ......................... | 705/4 |

OTHER PUBLICATIONS

"Choosing Your Own PIN Method", Internal Revenue Service IRS.gov (8 pages), http://www.irs.gov/efile/article/0,,id=101246,00.html.

"Authentication and Single Sign-on", JavaOne$^{SM}$ Sun's 2002 Worldwide Java Developer Conference., Session #3194 (27 pages).

* cited by examiner

*Primary Examiner* — April Shan
(74) *Attorney, Agent, or Firm* — Brooks, Cameron & Huebsch, PLLC

(57) ABSTRACT

A first information handling system ("IHS") receives identification information of a first user of a second IHS. The first IHS initiates a network session in response to authenticating the identification information of the first user. Within the network session, the first IHS receives identification information of a second user of the second IHS. The first IHS authenticates the identification information of the second user.

72 Claims, 3 Drawing Sheets

METHOD, SYSTEM, AND COMPUTER PROGRAM PRODUCT FOR THE AUTHENTICATION OF MULTIPLE USERS IN A COMMON SESSION

CLAIM TO EARLIER APPLICATIONS

This application claims priority to co-assigned U.S. Provisional Patent Application No. 60/488,011, filed Jul. 17, 2003, entitled SPOUSE AUTHENTICATION, naming Stewart, et al. as inventors, which is incorporated by reference in its entirety.

BACKGROUND

This description relates in general to information handling systems ("IHS") and in particular to a method, system, and computer program product for the authentication of multiple users in a common session.

In a transaction conducted via a network (e.g., the Internet), a provider of a product or service may authenticate a customer's identification information (e.g., user name and/or password) and in response, initiate a network session (e.g., hypertext transfer protocol ("HTTP") session) for receiving information from the customer. In some instances, a provider may receive information from multiple customers in connection with one or more transactions. For example, a provider of insurance may sell one or more insurance policies to a husband and a wife (e.g., jointly or separately). In doing so, the provider receives information from both the husband and the wife in connection with sale of the insurance policy (or policies). Such information may be transmitted through a request form (e.g., an "online" application form).

With an existing technique, the provider separately authenticates the husband's identification information and the wife's identification information, and in response to each authentication, initiates a separate network session for each respective authentication. Such technique causes various problems including inefficiency associated with initiating multiple sessions.

What is needed is a technique without the disadvantages described above.

SUMMARY

Accordingly, a first information handling system ("IHS") receives identification information of a first user of a second IHS. The first IHS initiates a network session in response to authenticating the identification information of the first user. Within the network session, the first IHS receives identification information of a second user of the second IHS. The first IHS authenticates the identification information of the second user.

DETAILED DESCRIPTION

Figure 1:
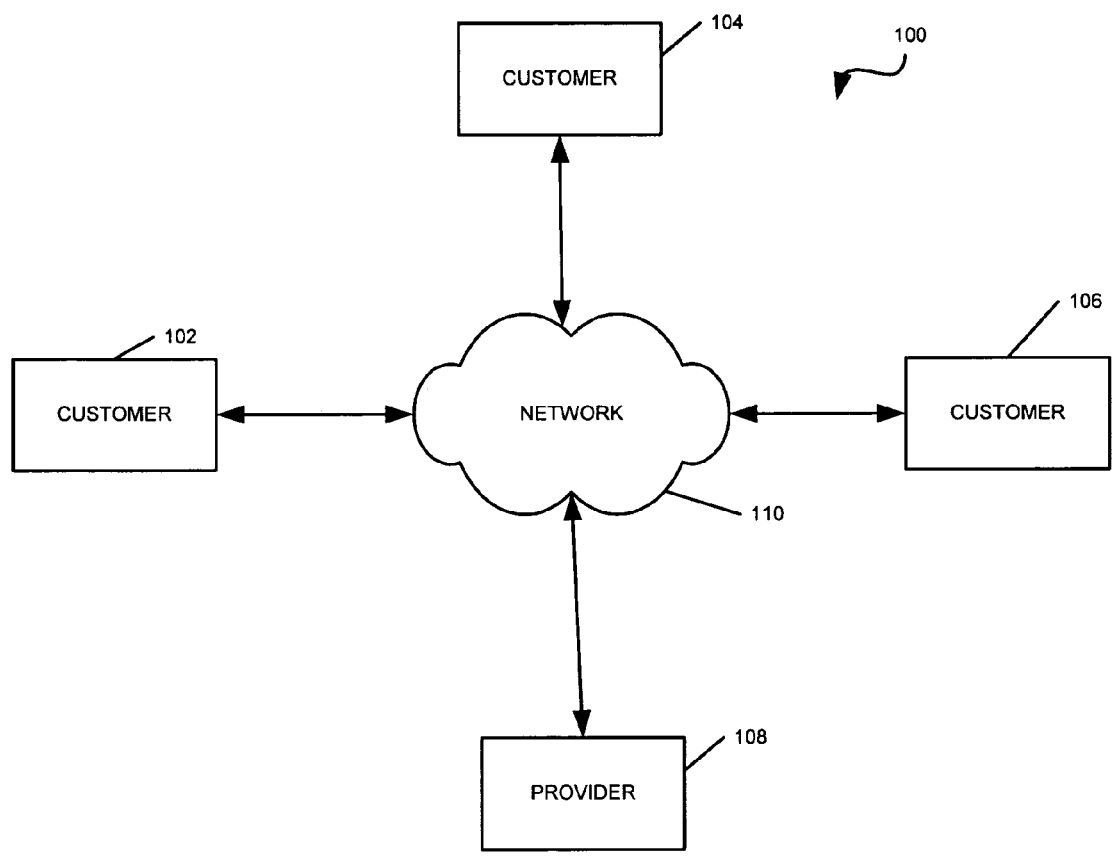
FIG. 1 is a block diagram of a system according to the illustrative embodiment.

FIG. 1 is a block diagram of a system, indicated generally at 100 according to the illustrative embodiment. The system 100 includes: (a) customers 102, 104, and 106 and (b) provider 108, for executing provider processes as discussed further below in connection with FIG. 3. The system 100 also includes a global computer network 110, such as a Transport Control Protocol/Internet Protocol ("TCP/IP") network (e.g., the Internet or an intranet).

Each of the customers 102, 104, and 106, and the provider 108 includes a respective network interface for communicating with the network 110 (e.g., outputting information to and, and receiving information from, the network 110), such as by transferring information (e.g., instructions, data, signals) between such customer and the network 110. Accordingly, through the network 110, the provider 108 communicates with the customers 102, 104, and 106, and vice versa.

For clarity, FIG. 1 depicts only three customers 102, 104, and 106 although the system 100 may include additional customers which are substantially identical to one another. Likewise, for clarity, FIG. 1 depicts only one provider 108, although the system 100 may include additional providers which are substantially identical to one another. In the discussion below, the customer 102 is a representative one of the customers 102, 104, and 106.

Each of the customers 102, 104, and 106, the provider 108, and the network 110 is a computing system, and includes a respective information handling system ("IHS") for executing processes and performing operations (e.g., processing and communicating information) in response thereto, as discussed further below in connection with FIG. 3. Each such IHS is formed by various electronic circuitry components. Moreover, as shown in FIG. 1, all such IHS's are coupled to one another. Accordingly, the customers 102, 104, and 106, and the providers 108 operate within the network 110. IHS's include personal computers ("PC"), personal digital assistants ("PDA"), portable computers (e.g., "laptop" computers), wireless devices, mainframe computers and any other system capable of handling (e.g., processing, receiving, outputting) information.

Figure 2:
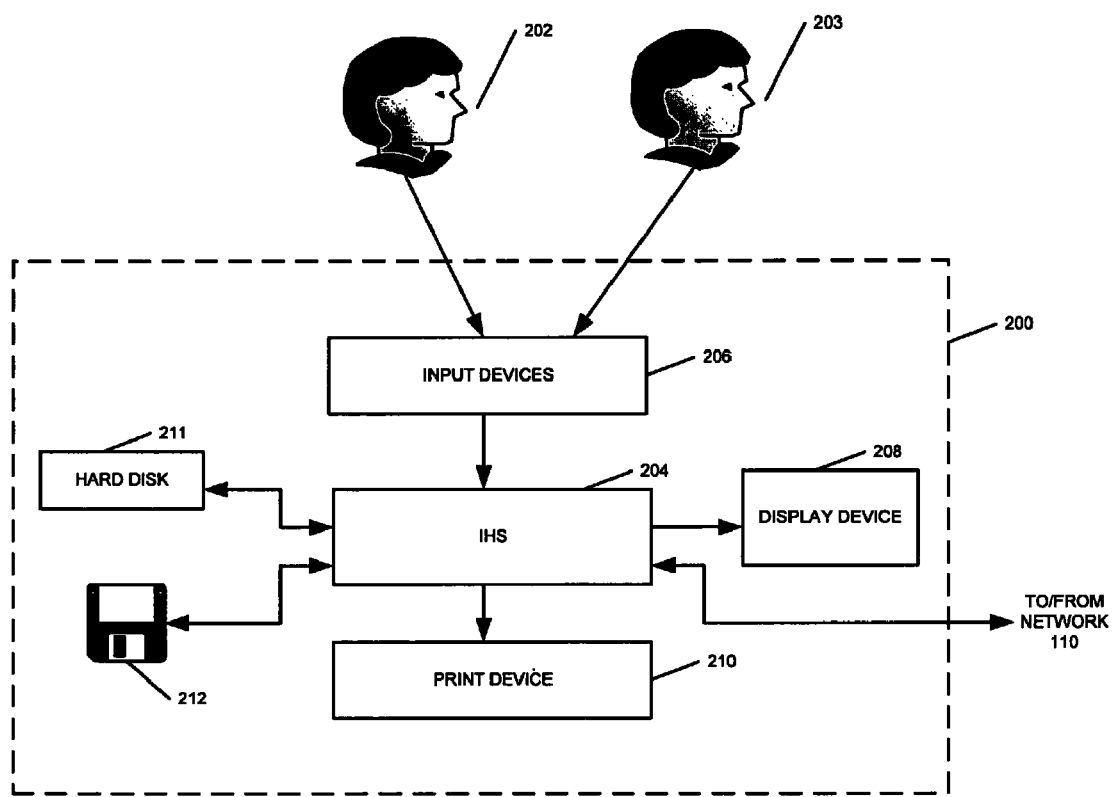
FIG. 2 is a block diagram of a representative information handling system ("IHS") of FIG. 1.

In FIG. 1, the provider 108 includes a provider of products and/or services (e.g., provider of products and/or services via the Internet). For example, the provider 108 includes a provider of insurances (e.g., personal insurance, automobile insurance, and home owner's insurance), provider of financial services (e.g., loans or financial accounts), provider of annuities and/or any other provider of products and/or services. FIG. 2 is a block diagram of a representative one of the computing systems of FIG. 1. Such representative computing system is indicated by a dashed enclosure 200. In the illustrative embodiment, each computing system of FIG. 1 operates in association with one or more respective human users. Accordingly, in the example of FIG. 2, the computing system 200 operates in association with human users 202 and 203, as discussed further below.

As shown in FIG. 2, the computing system 200 includes (a) an IHS 204 for executing and otherwise processing instructions, (b) input devices 206 for receiving information from human users 202 and 203, (c) a display device 208 (e.g., a conventional electronic cathode ray tube ("CRT") device) for displaying information to users 202 and 203, (d) a print device 210 (e.g., a conventional electronic printer or plotter) for printing visual images (e.g., textual and graphic information) on paper, (e) a nonvolatile storage device 211 (e.g., a hard disk drive or other computer-readable medium (or apparatus), as discussed further below) for storing information, (f) a computer-readable medium (or apparatus) 212 (e.g., a portable floppy diskette) for storing information, and (g) various other electronic circuitry for performing other operations of the computing system 200.

For example, the IHS 204 includes (a) a network interface (e.g., circuitry) for communicating between the IHS 204 and the network 110 and (b) a memory device (e.g., random access memory ("RAM") device and read only memory ("ROM") device) for storing information (e.g., instructions executed by IHS 204 and data operated upon by IHS 204 in response to such instructions). Accordingly, the IHS 204 is connected to the network 110, the input devices 206, the display device 208, the print device 210, the storage device 211, and the computer-readable medium 212, as shown in FIG. 2. For example, in response to signals from the IHS 204, the display device 208 displays visual images, and the users 202 and 203 view such visual images. Moreover, the users 202 and 203 operate the input devices 206 in order to input information to the IHS 204, and the IHS 204 receives such information from the input devices 206. Also, in response to signals from the IHS 204, the print device 210 prints visual images on paper, and the users 202 and 203 view such visual images.

The input devices 206 include, for example, a conventional electronic keyboard and a pointing device such as a conventional electronic "mouse", rollerball or light pen. The users 202 and 203 operate the keyboard to input alphanumeric text information to the IHS 204, and the IHS 204 receives such alphanumeric text information from the keyboard. The users 202 and 203 operate the pointing device to input cursor-control information to the IHS 204, and the IHS 204 receives such cursor-control information from the pointing device.

Referring again to FIG. 1, in the system 100, at least one IHS (e.g., a server IHS) of the provider 108 is for receiving information from at least one IHS (e.g., a client IHS) of the customer 102, in connection with a transactions via the network 110. For example, the provider 108's IHS receives such information input (e.g., "entered") via a request form (e.g., an "online" application form for an insurance policy) by one or more users (e.g., users 202 and 203) of the customer 102's IHS. For clarity, the following discussion references the provider 108's IHS as being a server IHS and the customer 102's IHS as being a client IHS.

For receiving information from the client IHS, the server IHS authenticates identification information of multiple users within a common network session. For example, the server IHS receives identification information of a first user (e.g., user 202), authenticates the identification information, and in response to authenticating the identification information, initiates a network session for receiving the information in connection with a transactions via the network 110. In one example, the information received is information of the first user. Also, within the network session, the server IHS receives identification information of a second user (e.g., user 203) and authenticates the identification information. In this way, within the same network session, the server IHS is capable of receiving information of the second user as well as the first user, in connection with the transaction. Moreover, the server IHS is operable to provide (e.g., output), the first user's information (e.g., information that is in common with the second user's information) at a later point during the network session. In such example, the first user and the second user are related to one another (e.g., the first user and the second user are associated with one another via a business relationship (e.g., business partnership) and/or in a family relationship (e.g., marriage)). FIG. 3 describes in more detail, such authentication of multiple users within a common session.

Figure 3:
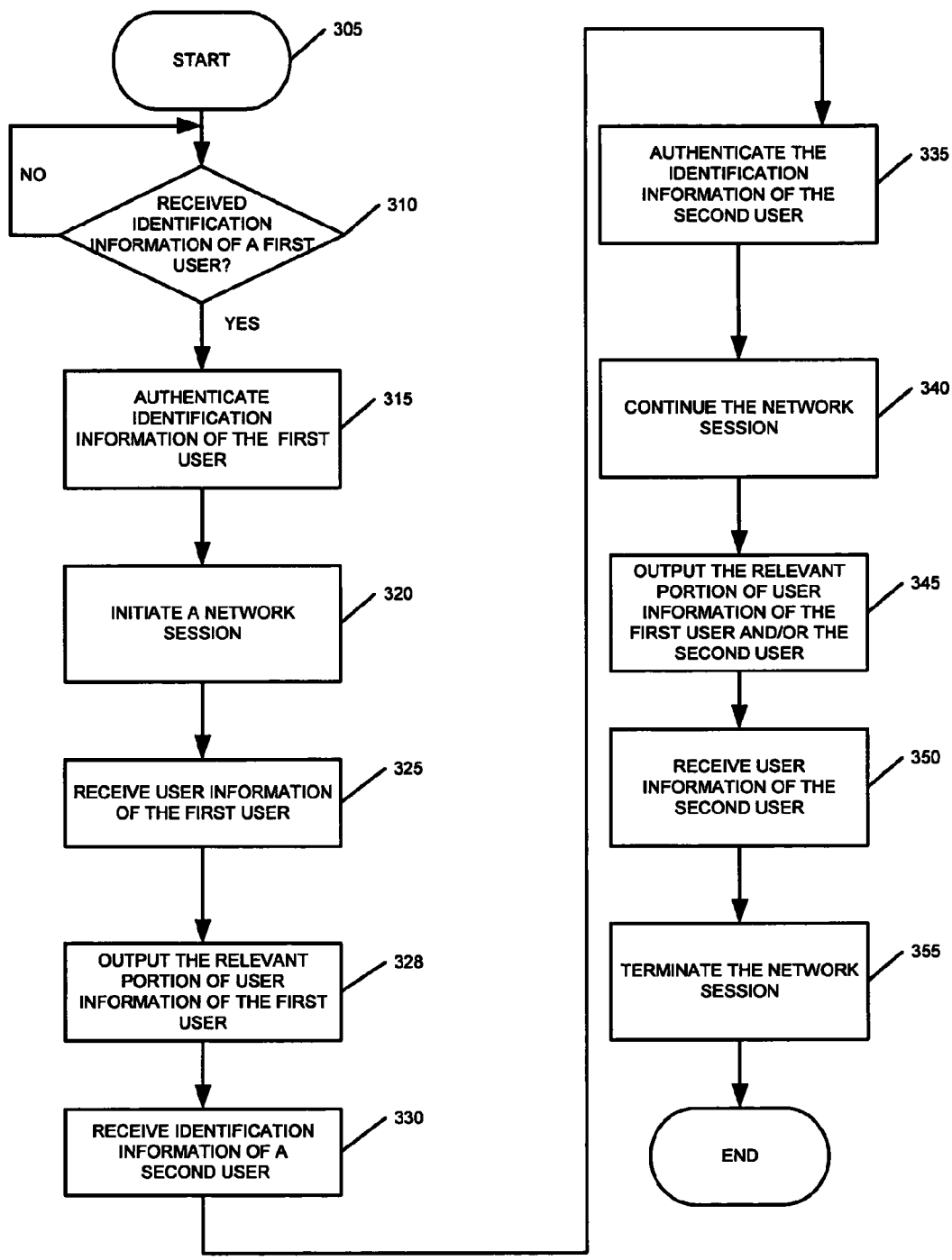
FIG. 3 is a flow chart of operations of a process executed by an IHS of FIG. 1.

FIG. 3 is a flow chart of operations of a process executed by the server IHS according to the illustrative embodiment. The operation begins at a step 310, where the server IHS self loops until it has received, from the client IHS, identification information (e.g., user name and password) of a first user of the client IHS.

In the illustrative embodiment, the server IHS receives such identification information when the first user "logs in" to a provider (e.g., the provider 108)'s web site (e.g., web site hosted by the server IHS) by inputting a user name and a password, to conduct a transaction (e.g., inquire about and/or purchase a product) with the provider. At the step 310, if the server IHS determines that it has received the identification information of the first user, the operation continues to a step 315.

At the step 315, in response to the identification information of the first user, the server IHS authenticates the identification information. The server IHS performs such authentication by, for example, validating that it has received a correct combination of known user name and password from the client IHS. After the step 315, the operation continues to a step 320.

At the step 320, in response to authenticating the identification information of the first user, the server IHS initiates a network session (e.g., a hyper-text transfer protocol ("HTTP") session) for communicating with the client IHS. More specifically, as shown in a step 325, via the network session, the server IHS receives user information of the first user from the client IHS.

The user information is associated with a transaction conducted through the network 110. In one example, the provider is a provider of insurance, the transaction is associated with a sale of an insurance policy, and the user information includes information associated with a request (e.g., application, request for a quote) for the insurance policy, such as the first user's gender, age, address, occupation, and health condition.

In some transactions such as the transaction associated with a sale of an insurance policy, the purchaser (e.g., the first user) is required to provide a signature for a document or a form (e.g., application form, information release authorization form, and contract), attesting to information included therein. With one technique, the purchaser provides such signature electronically by inputting unique identification information (e.g., personal identification ("PIN") number, password, user name), which is received by the server IHS. In one embodiment, the information is validated by a comparison to a known record of such information. State and federal regulations provide guidelines for the types and the amount of information required for such electronic signatures.

After the step 325, the operation continues to a step 328 where the server IHS outputs to the client IHS, at least a portion of the user information of the first user. After the step 328, the operation continues to a step 330. For an explanatory purpose, the following discussion references the transaction as being a transaction involving an insurance policy, although in other examples, the transaction involves any other products and/or services provided by the provider 108.

At the step 330, the server IHS receives identification information of the second user (e.g., the first user's spouse) from the client IHS. In one example, the server IHS receives such identification information if the server IHS receives an indication (e.g., from the client IHS via user input) that the second user as well as the first user wishes to apply for insurance. Also, the server IHS receives the identification information of the second user within the network session. After the step 330, the operation continues to a step 335.

At the step 335, the server IHS authenticates the identification information of the second user. The server IHS performs such authentication in a manner substantially similar to the authentication performed in the step 315 (discussed in more detail above). The server IHS does not initiate a separate network session in response to authenticating the identification information of the second user. Instead, as shown in a step 340, the server IHS continues the network session that was initiated in response to authenticating the identification information of the first user.

By authenticating the identification information of both the first user and the second user within the single network session, the server IHS is capable of providing the user information of the first user to the client IHS at a later point during the network session, after the server IHS authenticates the identification information of the second user. In one example, the server IHS receives the user information from the first user and stores such information in session variables. Via the session variables, the user information from the first user is available to the client IHS at a later point during the network session, (e.g., after the server IHS authenticates the identification information of the second user).

Referring again to FIG. 3, after the step 340, the operation continues to a step 345. At the step 345, the server IHS outputs to the client IHS, at least a portion of the user information of the first user and/or the second user. In one example, the portion output is a portion of user information of the first user that is related (e.g., in common) with user information of the second user. For the first user and the second user who are married, such information typically includes at least the home address. The server IHS outputs such common user information to the client IHS as a part of a request form (e.g., an "online" application form) to be completed with the user information of the second user. Accordingly, the server IHS outputs the common information as "pre-filled" information on the "online" application form.

As shown in FIG. 3, after the step 345, the operation continues to a step 350. Similar to operations of the step 325 discussed in more detail above, at the step 350, the server IHS receives the user information of the second user, such as various information associated with the transaction including, if appropriate, the second user's electronic signature. Thus, within the common network session, the server IHS is operable to authenticate identification information of multiple users (e.g., the first user and the second user). Although in the illustrative embodiment, the first user and the second user are engaged in a common (e.g., joint) transaction, in an alternative embodiment, each of the first user and the second user is engaged in a separate transaction. After the step 355, the operation continues to a step 355, where the server IHS terminates the network session.

As discussed above, in the illustrative embodiment, the server IHS receives information from the first user and the second user in connection with a transaction. In one example, the server IHS authenticates identification information from multiple users within a common network session, and receives information such as information for electronic signature for a signature form (e.g., signature card for a bank account) of the multiple users.

Referring again to FIG. 2, the computer-readable medium 212 is a floppy diskette. The computer-readable medium 212 and the IHS 204 are structurally and functionally interrelated with one another as described further below. Each IHS of the illustrative embodiment is structurally and functionally interrelated with a respective computer-readable medium, similar to the manner in which the IHS 204 is structurally and functionally interrelated with the computer-readable medium 212. In that regard, the computer-readable medium 212 is a representative one of such computer-readable media, including for example but not limited to the storage device 211.

The computer-readable medium 212 stores (e.g., encodes, or records, or embodies) functional descriptive material (e.g., including but not limited to software (also referred to as computer programs or applications) and data structures). Such functional descriptive material imparts functionality when encoded on the computer-readable medium 212. Also, such functional descriptive material is structurally and functionally interrelated to the computer-readable medium 212.

Within such functional descriptive material, data structures define structural and functional interrelationships between such data structures and the computer-readable medium 212 (and other aspects of the IHS 204, the computing system 200 and the system 100). Such interrelationships permit the data structures' functionality to be realized. Also, within such functional descriptive material, computer programs define structural and functional interrelationships between such computer programs and the computer-readable medium 212 (and other aspects of the IHS 204, the computing system 200 and the system 100). Such interrelationships permit the computer programs' functionality to be realized.

For example, the IHS 204 reads (e.g., accesses or copies) such functional descriptive material from the computer-readable medium 212 into the memory device of the IHS 204, and the IHS 204 performs its operations (as described elsewhere herein) in response to such material which is stored in the memory device of the IHS 204. More particularly, the IHS 204 performs the operation of processing a computer application (that is stored, encoded, recorded or embodied on a computer-readable medium) for causing the IHS 204 to perform additional operations (as described elsewhere herein). Accordingly, such functional descriptive material exhibits a functional interrelationship with the way in which IHS 204 executes its processes and performs its operations. Further, the computer-readable medium 212 is an apparatus from which the computer application is accessible by the IHS 204, and the computer application is processable by the IHS 204 for causing the IHS 204 to perform such additional operations. In addition to reading such functional descriptive material from the computer-readable medium 212, the IHS 204 is capable of reading such functional descriptive material from (or through) the network 110 which is also a computer-readable medium (or apparatus). Moreover, the memory device of the IHS 204 is itself a computer-readable medium (or apparatus).

Although illustrative embodiments have been shown and described, a wide range of modification, change and substitution is contemplated in the foregoing disclosure and, in some instances, some features of the embodiments may be employed without a corresponding use of other features.

What is claimed is:

1. A method of multiple user authentication and common information provision, comprising:

receiving, by a first information handling system ("IHS") comprising a computing device, identification information of a first user of a second IHS, wherein the identification information of the first user is input by the first user via an online insurance request form provided by an insurance provider;

initiating, by the first IHS, a network session between the first IHS and the second IHS in response to authenticating the identification information of the first user;

receiving, during the network session by the first IHS comprising a computing device, financial transaction information of the first user and linking the financial transaction information of the first user with a financial transaction for the second user, wherein the first user and the second user share common financial transaction information;

receiving, during the network session by the first IHS, identification information of the second user of the second IHS, the second user being a party to the financial transaction with the first user, wherein the identification information of the second user is input by the second user via an online insurance request form provided by the insurance provider;

authenticating, by the first IHS, the identification information of the second user;

authenticating, during the network session by the first IHS, that the second user is involved in the financial transaction and that the second user and the first user share common financial transaction information that is used during the financial transaction associated with the network session;

pre-filling the online insurance request form by the first IHS, with the common financial transaction information; and outputting, during the network session by the first IHS to the second IHS, the pre-filled online insurance request form to the second user of the second IHS.

2. The method of claim 1, further comprising:
receiving, during the network session by the first IHS, financial transaction information of the second user, wherein the financial transaction information of the second user includes the common financial transaction information.

3. The method of claim 1, further comprising:
receiving, by the first IHS, an inquiry from the first user about the financial transaction.

4. The method of claim 1, wherein the common financial transaction information comprises a home address of the first user and the second user.

5. The method of claim 3, wherein the inquiry from the first user about the financial transaction comprises a request for an insurance policy.

6. The method of claim 1, wherein the financial transaction document comprises a form.

7. The method of claim 6, wherein the form comprises an application.

8. The method of claim 1, wherein the financial transaction document comprises a contract.

9. The method of claim 1, further comprising:
receiving, during the network session by the first IHS, an electronic signature from each of the first user and the second user.

10. The method of claim 9, wherein the electronic signature includes a unique identifier.

11. The method of claim 10, wherein the unique identifier is a first unique identifier and the electronic signature includes a second unique identifier.

12. The method of claim 11, wherein the electronic signature includes a third unique identifier.

13. The method of claim 1, wherein the financial transaction information of the first user is associated with a signature form.

14. The method of claim 13, wherein the signature form is a signature card.

15. The method of claim 13, wherein the signature form is for information release authorization.

16. The method of claim 1, wherein the identification information of the first user and the identification information of the second user are received through a global computer network.

17. The method of claim 1, wherein the network session is a hyper text transfer protocol ("HTTP") session.

18. The method of claim 1, wherein the first user and the second user are related.

19. The method of claim 1, wherein the first user and the second user are related by business.

20. The method of claim 1, wherein the first user and the second user are in a family relationship.

21. The method of claim 1, further comprising:
receiving, during the network session by the first IHS, financial transaction information of the second user; and
populating, during the network session by the first IHS, the online insurance request form with the financial transaction information of the second user.

22. The method of claim 1, further comprising:
terminating, by the first IHS, the network session.

23. The method of claim 1, wherein the financial transaction information of the first user comprises a gender, an age, an address, an occupation, and a health condition of the first user.

24. The method of claim 1, wherein the first IHS is a server computing device and the second IHS is a client computing device.

25. A system for multiple user authentication and common information provision, comprising:
a first information handling system ("IHS") comprising a computing device, and a first IHS non-transitory computer readable storage medium located on a storage device that is coupled to the first IHS;
a second IHS comprising a computing device, coupled to the first IHS through a network, wherein the first IHS non-transitory computer-readable storage medium comprises computer readable instruction for:
receiving identification information of a first user from the second IHS, wherein the identification information of the first user is input by the first user via an online insurance request form provided by an insurance provider;
initiating a network session between the first IHS and the second IHS through the network in response to authenticating the identification information of the first user;
receiving, during the network session, financial transaction information of the first user from the second IHS and linking the financial transaction information of the first user with a financial transaction for the second user, wherein the first user and the second user share common financial transaction information;
receiving, during the network session, identification information of the second user from the second IHS, the second user being a party to the financial transaction with the first user, wherein the identification information of the second user is input by the second user via an online insurance request form provided by the insurance provider;
authenticating the identification information of the second user;
authenticating, during the network session, that the second user is involved in the financial transaction and that the second user and the first user share common financial transaction information that is used during the financial transaction associated with the network session;
pre-filling the online insurance request form by the first IHS, with the common financial transaction information; and outputting, during the network session by the first IHS to the second IHS, the pre-filled online insurance request form to the second user of the second IHS.

26. The system of claim 25, wherein the first IHS non-transitory computer-readable storage medium further comprises computer-readable instruction for:
receiving, during the network session, financial transaction information of the second user from the second IHS, wherein the financial transaction information of the second user includes the common financial transaction information.

27. The system of claim 25, wherein the first IHS non-transitory computer-readable storage medium further comprises computer-readable instruction for:
receiving, from the second IHS, an inquiry from the first user about the financial transaction.

28. The system of claim 25, wherein the common financial transaction information comprises a home address of the first user and the second user.

29. The system of claim 27, wherein the inquiry from the first user about the financial transaction comprises a request for an insurance policy.

30. The system of claim 25, wherein the financial transaction document comprises a form.

31. The system of claim 30, wherein the form comprises an application.

32. The system of claim 25, wherein the financial transaction document comprises a contract.

33. The system of claim 25, wherein the first IHS non-transitory computer-readable storage medium further comprises computer-readable instruction for:
receiving, during the network session, an electronic signature from each of the first user and the second user.

34. The system of claim 33 wherein the electronic signature includes a unique identifier.

35. The system of claim 34, wherein the unique identifier is a first unique identifier and the electronic signature includes a second unique identifier.

36. The system of claim 35, wherein the electronic signature includes a third unique identifier.

37. The system of claim 25, wherein the financial transaction information of the first user is associated with a signature form.

38. The system of claim 37, wherein the signature form is a signature card.

39. The system of claim 37, wherein the signature form is for information release authorization.

40. The system of claim 25, wherein the identification information of the first user and the identification information of the second user are received through a global computer network.

41. The system of claim 25, wherein the network session is a hyper text transfer protocol ("HTTP") session.

42. The system of claim 25, wherein the first user and the second user are related.

43. The system of claim 25, wherein the first user and the second user are related by business.

44. The system of claim 25, wherein the first user and the second user are in a family relationship.

45. The system of claim 25, wherein the first IHS non-transitory computer-readable storage medium further comprises computer-readable instruction for:
receiving, during the network session, financial transaction information of the second user from the second IHS; and
populating, during the network session, the online insurance request form with the financial transaction information of the second user.

46. The system of claim 25, wherein the first IHS non-transitory computer-readable storage medium further comprises computer-readable medium instruction for:
terminating the network session between the first IHS and the second IHS.

47. The system of claim 25, wherein the financial transaction information of the first user comprises a gender, an age, an address, an occupation, and a health condition of the first user.

48. The system of claim 25, wherein the first IHS is a server computing device and the second IHS is a client computing device.

49. A non-transitory computer-readable storage medium for multiple user authentication and common information provision, the computer-readable medium comprising computer-readable medium instruction that are processable by a first information handling system ("IHS") comprising a computing device, to:
receive identification information of a first user of a second HIS, comprising a computing device, wherein the identification information of the first user is input by the first user via an online insurance request form provided by an insurance provider;
initiate a network session between the first IHS and the second IHS in response to authenticating the identification information of the first user;
receive, during the network session, financial transaction information of the first user and link the financial transaction information of the first user with a financial transaction for the first user and a second user, wherein the first user and the second user share common financial transaction information;
receive, during the network session, identification information of the second user of the second IHS, the second user being a party to the financial transaction with the first user, wherein the identification information of the second user is input by the second user via an online insurance request form provided by the insurance provider; and
authenticate the identification information of the second user;
authenticate, during the network session, that the second user is involved in the financial transaction and that the second user and the first user share common financial transaction information that is used during the financial transaction associated with the network session;
pre-fill the online insurance request form by the first IHS, with the common financial transaction information; and
output, during the network session by the first IHS to the second IHS, the pre-filled online insurance request form to the second user of the second IHS.

50. The non-transitory computer-readable storage medium of claim 49, wherein the non-transitory computer-readable storage medium further comprises computer-readable instruction that are processable by the first IHS to:
receive, during the network session, financial transaction information of the second user, wherein the financial transaction information of the second user includes the common financial transaction information.

51. The non-transitory computer-readable storage medium of claim 49, wherein the non-transitory computer-readable storage medium further comprises computer-readable instruction that are processable by the first IHS to:
receive an inquiry from the first user through the second IHS about the financial transaction.

52. The non-transitory computer-readable storage medium of claim 49, wherein the common financial transaction information comprises a home address of the first user and the second user.

53. The non-transitory computer-readable storage medium of claim 51, wherein the inquiry from the first user about the financial transaction comprises a request for an insurance policy.

54. The non-transitory computer-readable storage medium of claim 49, wherein the financial transaction document comprises a form.

55. The non-transitory computer-readable storage medium of claim 54, wherein the form comprises an application.

56. The non-transitory computer-readable storage medium of claim 49, wherein the financial transaction document comprises a contract.

57. The non-transitory computer-readable storage medium of claim 50, wherein the non-transitory computer-readable storage medium further comprises computer-readable instruction that are processable by the first IHS to:
receive, during the network session, an electronic signature from each of the first user and the second user.

58. The non-transitory computer-readable storage medium of claim 57 wherein the electronic signature includes a unique identifier.

59. The non-transitory computer-readable storage medium of claim 58, wherein the unique identifier is a first unique identifier and the electronic signature includes a second unique identifier.

60. The non-transitory computer-readable storage medium of claim 59, wherein the electronic signature includes a third unique identifier.

61. The non-transitory computer-readable storage medium of claim 49, wherein the financial transaction information of the first user is associated with a signature form.

62. The non-transitory computer-readable storage medium of claim 61, wherein the signature form is a signature card.

63. The non-transitory computer-readable storage medium of claim 61, wherein the signature form is for information release authorization.

64. The non-transitory computer-readable storage medium of claim 49, wherein the identification information of the first user and the identification information of the second user are received through a global computer network.

65. The non-transitory computer-readable storage medium of claim 49, wherein the network session is a hyper text transfer protocol ("HTTP") session.

66. The non-transitory computer-readable storage medium of claim 49, wherein the first user and the second user are related.

67. The non-transitory computer-readable storage medium of claim 49, wherein the first user and the second user are related by business.

68. The non-transitory computer-readable storage medium of claim 49, wherein the first user and the second user are in a family relationship.

69. The non-transitory computer-readable storage medium of claim 49, wherein the non-transitory computer-readable storage medium further comprises computer-readable instruction that are processable by the first IHS to:
receive, during the network session, financial transaction information of the second user from the second IHS; and
populate, during the network session, the online insurance request form with the financial transaction information of the second user.

70. The non-transitory computer-readable storage medium of claim 69, wherein the non-transitory computer-readable storage medium further comprises computer readable instruction that are processable by the first IHS to:
terminate the network session between the first IHS and the second IHS.

71. The non-transitory computer-readable storage medium of claim 69, wherein the financial transaction information of the first user comprises a gender, and age, an address, an occupation, and a health condition of the first user.

72. The non-transitory computer-readable storage medium of claim 49, wherein the first IHS is a server computing device and the second IHS is a client computing device.

* * * * *